Jan. 24, 1967     E. H. LYONS, JR     3,300,345
ELECTROLYTIC CELL FOR PRODUCING ELECTRICITY
AND METHOD OF OPERATING THE CELL
Filed Sept. 3, 1964     7 Sheets-Sheet 1

INVENTOR.
ERNEST H. LYONS, JR.
BY
Owen, Wickersham & Erickson
ATTORNEY

INVENTOR.
ERNEST H. LYONS, JR.
BY
ATTORNEY

Jan. 24, 1967   E. H. LYONS, JR   3,300,345
ELECTROLYTIC CELL FOR PRODUCING ELECTRICITY
AND METHOD OF OPERATING THE CELL
Filed Sept. 3, 1964   7 Sheets-Sheet 4

INVENTOR.
ERNEST H. LYONS, JR.
BY Owen, Wickersham, & Erickson
ATTORNEYS

INVENTOR.
ERNEST H. LYONS, JR.
BY
ATTORNEYS

FIG. 26.
APPARATUS FOR GRAVIMETRIC DETERMINATION (ASCARITE)

FIG. 27. CIRCUIT DIAGRAM FOR MEASUREMENTS WITH AIR CATHODE (FUEL CELL)

(PLATINUM SPIRAL AUXILIARY CATHODE HAS BEEN ADDED TO FUEL CELL)

FIG. 28.
CIRCUIT DIAGRAM FOR MEASUREMENTS WITH HYDROGEN CATHODE

INVENTOR
ERNEST H. LYONS, JR.
BY
Owen, Wickersham & Erickson
ATTORNEYS

United States Patent Office 3,300,345
Patented Jan. 24, 1967

3,300,345
ELECTROLYTIC CELL FOR PRODUCING ELECTRICITY AND METHOD OF OPERATING THE CELL
Ernest H. Lyons, Jr., Box 37, Elsah, Ill. 62028
Filed Sept. 3, 1964, Ser. No. 396,462
8 Claims. (Cl. 136—86)

This application is a continuation-in-part of application Serial No. 282,190 filed April 30, 1963, now abandoned, which was a continuation-in-part of application Serial No. 225,919 filed September 24, 1962, now abandoned, which was a continuation-in-part of application Serial No. 186,664, filed April 11, 1962, now abandoned.

This invention relates to improvements in electrolytic cells of the type having at least one gaseous electrode, such as an oxygen cathode or a hydrogen or hydrocarbon anode or both. Such cells include the so-called air-depolarized primary voltaic cells and both direct and indirect fuel cells.

Such cells supply electric current to an external circuit as a result of electrochemical reactions within the cell. These reactions are not yet fully understood, but a net result is an oxidation reaction at the anode where electrons are produced, and the electrons return through the exterior circuit to the cathode, where typically oxygen is supplied to the electrolyte in order to sustain the oxidation reaction at the anode. The gas electrode comprises a catalytic metal member or a porous carbon member impregnated with catalysts against or through which a stream of the reacting gas is passed into the electrolyte, usually a solution. Various electrolytes—acidic, basic, and neutral—are well known.

Whatever the electrodes and electrolyte, thermodynamic data enable electrochemists to calculate the voltage which should be produced in the cell. These voltages differ, depending on the material that is oxidized at the anode and on that which is reduced at the cathode and on the extent to which these reactions proceed, and their theoretical values are precisely determinable.

However, when such cells have actually been built, the theoretical voltages have not generally been attained; in fact, the measured voltages have commonly been far below the theoretical values, not only when current was flowing, as the result of polarizations of various kinds, but also on open circuit. For example, heretofore, efforts to draw any significant current from a cell incorporating a gaseous hydrocarbon electrode at ordinary temperature have been unsuccessful; and even on open circuit, no definite potentials have been obtained, indicating that any reaction involving the hydrocarbon was negligibly slow.

In the case of oxygen it has generally been supposed that the reduction of oxygen at these electrodes proceeded only to the peroxide state, because they have exhibited potentials less than the theoretical voltages expected from reduction of oxygen to water. Even though catalytic effects from specific electrode surfaces resulted in raising the voltage by decomposing the peroxide so rapidly that its concentration was minimal (sometimes estimated at $10^{-7}$ M.), and the oxygen so produced was re-reduced, so that it was ultimately consumed in a net four-electron reduction, the potential expected for reduction of oxygen to water has not heretofore been attained except in one unique laboratory experiment by Bockris and Huq involving protracted and cumbersome procedures not suitable for commercial practice. This failure has represented a substantial loss in power output of the cell.

The reduction in voltage below the open-circuit value, part of which is sometimes referred to as "overvoltage," has been attributed to polarization of the cell. Three types of such polarization are recognized: (1) resistance polarization, due to the resistance of the solution which results in an IR drop, (2) activation polarization, connected with the finite rate of time at which the chemical and electrochemical reactions take place at the electrode, and (3) concentration polarization, due evidently to concentration changes in the electrolyte at the electrodes. By choosing a suitable electrolyte and using the minimum practical spacing of electrodes, the overvoltage due to the resistance drop of the solution can be held to a low value. However, activation polarization and concentration polarization have been serious factors in reducing the actual voltage to only a fraction of the theoretical voltage.

Recent studies have shown that the electrochemical reactions in the vicinity of gas electrodes are far more complex than had been believed heretofore, but these studies have not solved the problem of how to obtain actual voltage outputs approaching the theoretical values, particularly when current is drawn from the cell.

One object of this invention is to enable one to get a substantially higher voltage from a cell having one or more gas electrodes.

Another object is to provide a low-temperature hydrocarbon fuel cell from which substantial amounts of current can be drawn.

A further object is to improve the operation of hydrogen fuel cells.

Still another object is to reduce the polarization at a working oxygen electrode.

An additional object is to enable the obtaining of substantially theoretical potentials with an oxygen electrode.

Other objects and advantages of the invention will become clear from the following description.

I have found that, although activation polarization proceeds quite rapidly, it does begin at a quite low value, presumably zero, and increases to a substantial value in a finite time, during which the voltage drops from a value quite close to the theoretical value down to the rather disappointing values heretofore obtained.

I have also found that, at the first, the electrolytic reduction of oxygen at certain catalytic surfaces, including platinum, palladium, nickel, cobalt, and iron oxides, the reduction proceeds to water. However, subsequently the oxides are removed or altered by reduction, and their ability to effect reduction of oxygen to water is impaired or eliminated, and reduction of oxygen to peroxide sets in, with consequent power loss.

Moreover, I have discovered that when the cell current is interrupted by opening the circuit for a finite time, not only does concentration depolarization take place, but also there is a tendency to restore the activity (activation depolarization) of the catalytic electrode surface, particularly in alkaline electrolyte.

These finding have led me to the conclusion that periodic interruption of the current can be made to maintain the desired type of active surface. This conclusion has been verified in a number of actual cells in which the potential of the oxygen electrode has been maintained near the theoretical value, even though substantial currents have been drawn. The potential of the electrode under examination was measured relative to suitable reference electrodes during periods when current was flowing through the cell.

The time intervals involved in both activation polarization and activation depolarization are quite short, and my invention uses them to obtain an increase in actual voltage by providing a make-break arrangement. The voltage obtained is a pulsating voltage, but can be fairly steady even so. Moreover, by using a plurality of cathodes in a single cell, the cell can put out current steadily, the cathodes being alternately put into and out of the circuit in a way that gives a fairly steady and quite high voltage. Banks of cells can also be used to produce either pulsating direct current or quite steady direct current or alternating current having practically a square wave form.

In some instances the restoration of activity to the electrode surface, presumably through chemical oxidation by oxygen dissolved in the electrolyte or supplied in some other way, is inconveniently slow. I have found that the restoration may be hastened by imposition of a small anodic potential, or in some instances, by providing intimate contact with a metal surface which is less active (more cathodic) than the electrode surface to be activated. Thus, a partial coating of palladium on platinum greatly increases the reactivation. Other combinations are platinum-nickel, platinum-silver, platinum-gold, nickel-silver, nickel-gold, etc. The use of copper, silver, or gold as the activating addend is particularly effective since these metals do not readily form oxide layers. The addend metals may be applied by electrodeposition, flame-spraying, powder metal techniques, or in other suitable ways, and the sub-surface metal should be partially exposed to and in contact with the electrolyte, through openings, pores, or other discontinuities in the surface material.

The invention will be easier to understand by considering the following drawings, in which.

Figure 1:
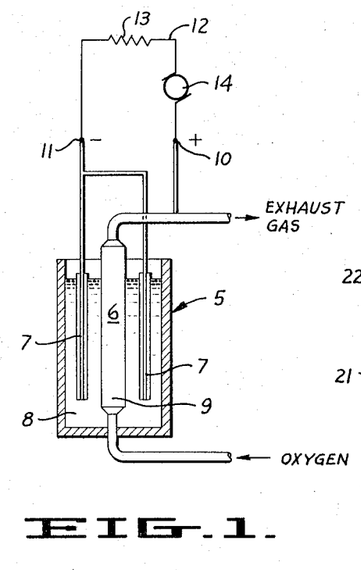
FIG. 1 is a somewhat diagrammatic view of an electrolytic cell embodying the principles of the invention, the cell being shown generally in elevation and in section.

The principles of the invention may be illustrated by considering several specific examples. Thus, FIG. 1 diagrammatically illustrates a cell 5 having an oxygen cathode 6, an anode 7, and an electrolyte 8. The cathode 6 may comprise a tube 9 of graphite, or porous platinum or a fine screen of platinum. Nickel, nickel oxide (preferably doped with $Li_2O$), and silver are other suitable conductive materials, and of course many other materials are also suitable at the cathode 6. The purpose is to get oxygen into the solution 8. The oxygen may be supplied as air or as pure oxygen or in mixtures to the hollow interior of the tube 9 and pass to the active surface by means of openings or pores; or oxygen may be bubbled through a sparger located below the cathode 6 and reach the exterior surface of the cathode 6 by physical contact of the rising gas bubbles, or by diffusion, as gas dissolved in the electrolyte. The anode 7 may be a lower metallic oxide (e.g., $Cu_2O$, $CoO$, $PbO$, $Mn_3O_4$, $Fe_3O_4$) as disclosed in my co-pending application, Serial No. 840,196, filed September 15, 1959. Or the anode may be hydrogen, a hydrocarbon, or other oxidizable material. The electrolyte 8 for this cell 5 is, for many types of anodes, preferably basic (e.g., 20% KOH or NaOH in water), because the base helps to maintain or to restore the active surface of the cathode. The cathode 6 has a terminal 10, and the anode 7 has a terminal 11, which are connected together by a lead 12 through a load 13.

For example, in a copper oxide-oxygen cell using potassium hydroxide as electrolyte, the theoretical voltage is about 0.56 volt, but when using the cell as so far described, there is an overvoltage of 0.25 to 0.30 volt at currents amounting to 20 to 50 milliamperes per square centimeter of electrode surface, cutting the actual voltage to about half of the theoretical value.

My invention incorporates a type of switching device 14, such as a cummutator or an electronic switching device. In a cell 5 with a copper oxide anode 7, a small platinum wire oxygen cathode 6, and a potassium hydroxide electrolyte 8, I have been able to cut the overvoltage to about 0.05 volt at a current output of 20 milliamperes per square centimeter of cathode surface, by interrupting the circuit at the switch 14 at a rate of 182 times per second, so that about 90% of the theoretical voltage was obtained by this expedient.

To illustrate what happens, a circuit like that in FIG. 1 was used with a manual key as the switch 14 and a cathode-ray oscilloscope as part of the load 13, and a series of oscillograms was prepared using a cell 5 of this type $(Pt)Hg/HgO(c),10\%KOH/O_2(in\ air)(Pt\ or\ Pd)$ For this illustration, the cell 5 included a mercury-mercuric oxide reference electrode in a 250 milliliter Erlenmeyer flask, a 10% KOH electrolyte, and a platinum electrode in a 100 milliliter beaker, connected to the reference electrode by means of a salt bridge. It was provided with a coarse fritted glass sparger through which air was bubbled. The platinum electrode was a piece of #24 platinum wire sealed in soft glass tubing with a mercury bead contact. 1.2 centimeters of the wire was exposed to the solution in the stream of air bubbles from the sparger.

In accordance with the discovery mentioned above, difficulty was experienced in obtaining reproducible results from several electrodes until they were "palladinized" (i.e., electroplated with a spongy black coating of palladium) in chloropalladinic acid, rinsed, and then anodized in 1% KOH for two minutes. The palladinizing greatly improved the behavior of the electrodes under load.

Two series of curves were photographed, one with a 10,000 ohm load across the cell, to show characteristics at very low drain, and another with an 800 ohm load, which gave a much higher current density of between one and two milliamperes per square centimeter of cathode surface.

Figures 5, 6, 7, 8, 9, 10, 11, 12:
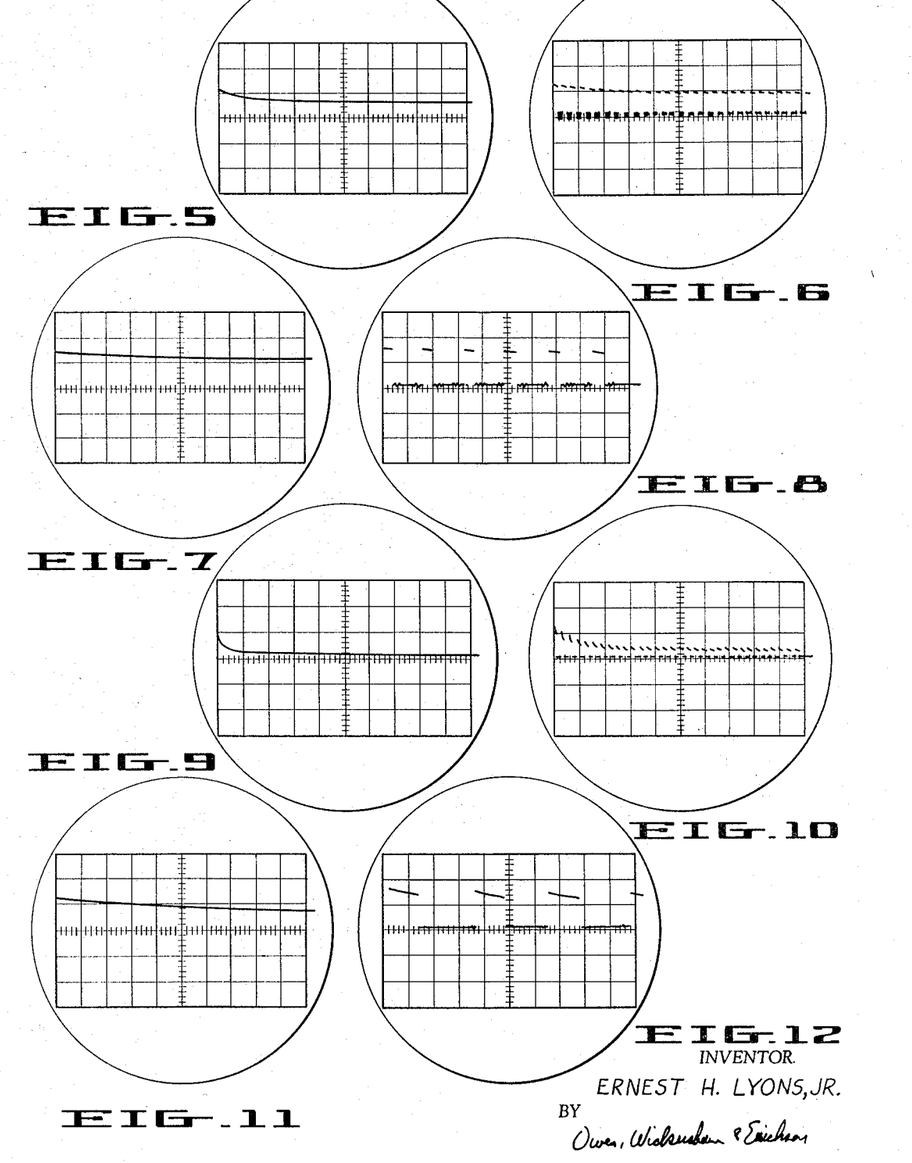
FIGS. 5 through 12 are oscillograms obtained from tests illustrating what is obtained from the apparatus of FIG. 1 under different circumstances.

FIGS. 5 and 6 show discharge curves across 10,000 ohms, FIG. 5 being under steady discharge and FIG. 6 with interrupted discharge obtained by manually tapping the key switch 14. The oscillograph was set at 0.2 volt per centimeter, the scale shown representing 6 x 10 centimeters. Open circuit voltage was 0.30 volt, and the trace appeared to start at 0.28 volt. The time scale is 10 seconds, and it is estimated that the interrupted discharge was approximately 50% off, 50% on, on a three cycle per second schedule. On an equal coulomb basis, therefore, one second on FIG. 5 should be compared with two seconds on FIG. 6. Nevertheless, it seems clear that the voltage drop in this instance was about twice as large, coulomb, on steady discharge as on cyclic discharge. Furthermore, the final voltage remained at 0.18 volt for 20 minutes on cyclic discharge, but fell to 0.03 volt in 10 minutes on steady discharge. The results with interruption even at this slow rate are markedly superior to those obtained with steady discharge. On a faster cycle, the results are even better.

FIGS. 7 and 8 have a similar comparison for the same electrode on a one second time scale. From FIG. 7 it is seen that the on-time is not too critical but should be not more than 0.1 second. In FIG. 8, it is seen that the voltage drop is 0.02 volt (0.1 cm.) after six on-periods of about 0.4 second each. Comparing this with a drop of 0.04–0.05 volt after 2.4 seconds on FIG. 7, the advantage of interruptions is demonstrated once more. On continuing the cycle of FIG. 8 for ten minutes, a total drop of 0.04 volt was noted, and recovery of voltage during idle periods became noticeable.

FIGS. 9 and 10 are similar to FIGS. 5 and 6 with a ten second time scale, but here the variable load resistor was set at 200 ohms, so that the current density was about 4.5 to 6.0 millamperes per square centimeter. Under this load, polarization was of course much more rapid. Furthermore, in this test the initial voltage was only 0.13 volt, nearly all of the decrease being the result of the IR drop in the cell. The rapid voltage drop in steady discharge is apparent in FIG. 9, amounting to 0.05 volt in 0.2 second, and 0.08 volt in 1 second. From FIG. 10 the importance of providing interruption at less than 0.1 second is clear; 0.01 second being much better. Recovery during idle periods is prominent and substantial, amounting in the significant portion of the curve to at least 0.03 volt. The substantial drop in initial voltage for each pulse over the ten second period is apparently the result of too slow a cycle; tests at one cycle per second showed even greater drop, as would be expected from FIG. 9. Even so, the interrupted cycle drops off far less rapidly than the steady discharge, the comparisons being made at equal coulombs withdrawn; and the final voltage after ten seconds is 0.03 volt (initial voltage of the pulses) compared to 0.018 volt at six seconds for steady discharge.

FIG. 11 shows a steady discharge curve at the same load and current density for 1.0 second, and permits selection of a 0.2 second on-time to restrict voltage drop to 0.02 volt.

FIG. 12 shows the curves with a load of 200 ohms and a total time of one second, with a doubled voltage scale (0.1 v./cm.). The drop in initial voltage after three pulses totaling about 0.3 second is 0.02 volt, compared to 0.06 volt on steady discharge (not shown). The recovery during idle periods is marked, and the desirability of limiting pulses to about 0.01 second is plain.

If the electrode surface maintained constant catalytic activity, activation polarization would be nearly constant, and increases of polarization, as shown by these curves, would represent mainly concentration effects. These would be diminished by current interruptions, because diffusion would proceed during the idle periods to partially counteract the concentration changes. From another viewpoint, since the means current over a period embracing several interruptions is less than the steady current, the concentration changes are smaller. Accordingly, although comparisons are made on an equal coulomb basis, it is still to be expected that concentration polarization will be less with interrupted current than with steady current. The problem, then, is to distinguish between polarization resulting from concentration changes, and polarization which is the consequence of changes in the catalytic activity of the electrode.

If concentration polarization were related in simple fashion, as linearly, to the current or time, it would be easy to correct for it and so to distinguish changes in activity of the electrode. But in view of the uncertainties as to micro-configuration and hence the precise effective area of the electrode, as well as other parameters, established polarization functions cannot be applied.

In principle it would be desirable to compare means potentials after various intervals of current flow with corresponding open circuit potentials; but this, too, is not a feasible procedure in this system, because the open circuit value depends on the history of the electrode, and therefore varies throughout the pulse of current flow.

Results of practical significance may, however, be obtained by measuring the time required for polarization to reach some arbitrary value relative to the initial value. For example, in FIGS. 5 and 7, the apparent total polarization, relative to the starting point, reaches 0.04 volt after one second of current flow, whereas in FIG. 6 it has not reached this value even after ten seconds. Or, using 0.02 volt as the comparison point, it is reached in 0.3 second with steady current (FIGS. 5 and 7), but requires about 3 seconds with interrupted current (FIG. 6). Evidently polarization occurred about ten times more slowly with interrupted current in this set of runs. A changes of this magnitude is hardly the result of concentration effects only.

With the heavier currents, as shown in FIGS. 9–12, a comparison value of 0.04 volt for apparent polarization, was reached in 0.3 second in FIG. 9 and 0.6 second in FIG. 11, whereas it required about 1 second in FIG. 10, and was not even reached in 1 second in FIG. 12. A comparison point of 0.02 volt was attained in 0.2 second in FIG. 9 and 0.3 second in FIG. 11, whereas it required 0.6 second in FIG. 10 and 1 second in FIG. 12. The advantage of about 3-to-1 is still too large to be attributed to concentration effects exclusively.

A significant fact is that the advantage is very much greater (10–1) for interrupted current at low currents (FIGS. 5–8) than it is (3–1) at high currents. If concentration effects were responsible, the exact opposite would be observed, since these would be larger with higher currents. This is clear evidence of the fact that an activation factor is operating to the marked advantage of the interrupted current. It is, of course, in harmony with the inference that the advantages are too large to be explained solely by concentration changes, drawn before this last comparison was made. If reliable open circuit potential measurements were available, the difference between interrupted and steady currents would probably be even more striking.

The magnitude of the open-circuit voltage (even though its precise value is affected by the previous history of the electrode surface) shows that the reduction occurring is oxygen to water. Reduction to peroxide would lower the voltage to 0.03 volt or lower if peroxide accumulates at the electrode surface, and none of the voltages recorded, even under load, approach this value, due regard being given to IR drop. The results also show that after some seconds, the potential drops to that expected for reduction to peroxide. Interruptions in current result in partial recovery of the initial voltage; hence reduction to water regains predominance.

The surface state of the electrode is extremely important, as previously indicated. Some electrodes recover their activity for reduction to water very much more rapidly than others, the time for complete recovery varying from 30 seconds to 45 minutes, after polarization had proceeded to a substantially steady value. Two types of voltage-shift are observed. One is quite rapid under load, and is followed by a rapid recovery, or at least a partial recovery. This shift is attributed to concentration changes at the electrode surface, and may be properly termed polarization. It can be minimized by appropriate arrangement of the oxygen supply, agitation of the electrolyte, and the surface state of the electrode. The other is due to a gradual change in the electrode reaction, from one of reduction to water to another of reduction to peroxide. This second change is slower and more profound, and appears to be the result of a change in the condition of surface of the electrode. It is not polarization in the usual electrochemical sense, altough it satisfies the formal definition of polarization. This change depends partly on the surface area of the electrode catalyst, and by using a large surface area per current density, the pulsing is required much less often. By using a sufficiently large area, a pulse of twice a day will be as effective as the pulse of twenty times per second on the small platinum wire electrode.

As has been explained, part of the advantage of the interrupted current is the maintenance of a more active electrode surface. One possible theory is that the electrode surface has an oxide film and that this phenomenon of greater activity is connected with the type or condition of the oxide film. The importance of this surface condition is also shown by the time required for complete recovery of initial open-circuit voltage, often ten minutes and sometimes forty-five minutes, after extending operation. Decay of concentration polarization is much more rapid.

Consideration was given to the possibility that the reduction of surface oxides (if such exist) on the electrodes might appear to be oxygen reduction. Coulometric studies indicate that at least one hundred atoms thicknesses of oxygen would be required, allowing for an actual surface area twenty times greater than the apparent. Such films are unknown on platinum. Furthermore, the potentials are too high for platinous or palladinous oxide or hydroxide. The standard potentials for higher oxides are not known with certainty, so that potential data cannot be used to distinguish their reduction from that of oxygen; but the coulometric data, and the general chemistry of the metals, appear to rule them out.

The simple cell 5 shown in FIG. 1 of course puts out voltage and current only some of the time. Continuous output can be obtained by the expedient shown in FIG. 2. Here a cell 20 has an electrolyte 21, an anode 22, and a series of cathodes; five oxygen cathodes 23, 24, 25, 26, and 27 are shown, each connected by a separate lead 28, 29, 30, 31, and 32 to a separate terminal 33, 34, 35, 36, and 37. The switch has an arm 38 that moves cyclically across the terminals. As a result, each oxygen cathode 23, 24, 25, 26, and 27 is connected very slightly less than one-fifth of the time, while the current is substantially on a constant output basis, and by choosing the cycle speed appropriately, the voltage is also nearly constant.

Figure 3:
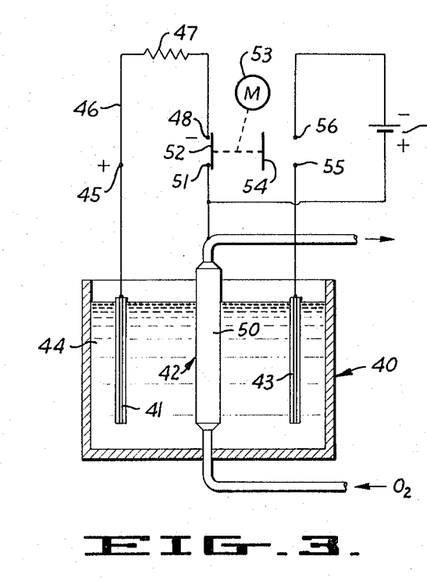
FIG. 3 is a view in elevation, generally diagrammatic, of another modified form of cell also embodying the invention.

When using an acidic electrolyte, mere interruption of the current does not usually result in the necessary recovery of catalytic activity of the cathode within a useful time. I have found that with acidic electrolytes it is wise to anodize the cathode periodically during some or all of the off cycles, for example as shown in FIG. 3. Here, a cell 40 has an anode 41, and two cathodes 42 and 43 in an acid electrolyte 44, the cathode 42 being an oxygen cathode. From an anodic terminal 45 a lead 46 passes through a lead 47 to a terminal 48. The oxygen cathode 42 has a metal or graphite tube 50 with a terminal 51. During the "on" portion of the cycle, a switch 52 bridges the terminals 48 and 51, the switch 51 being put "on" and "off" by a suitable device 53.

During the "off" portion of the cycle, the switch 52 is opened, and a switch 54 (which may be ganged with or at least synchronized with the switch 52) bridges terminals 55 and 56. The terminal 55 is connected to the second cathode 43. The terminal 56 is connected through a small battery 57 (i.e., only a fraction of the output of the cell 40) to the tube 50. Thereby the tube 50 is anodized during the off portions of the cycle.

Suitable arrangements in timing and spacing may be made to employ the cathode 43 as an oxygen cathode also, with most of the current during its "on" portion going to the anode 41 and only a small portion providing the anodizing current for the cathode 42; the cathode 43 is, in that event, similarly anodized during its "off" portion of the cycle. The battery 57 may, on the other hand, be either an independent battery or may represent only part of the output of an oppositely timed second cell.

Figure 4:
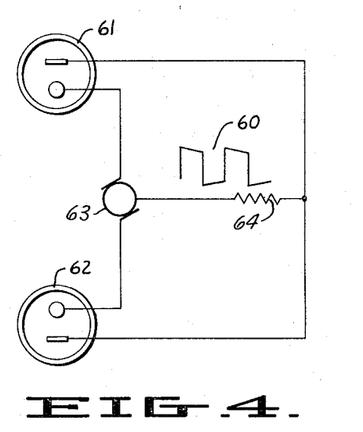
FIG. 4 is a top plan view, generally diagrammatic, of two cells alternated in bank to produce an alternating so-called square wave of the type generally like that shown.

It is obvious that similarly wired opposite timed cells produce continuous somewhat pulsating D.-C. when wired in bank. FIG. 4 shows that substantially square wave A.-C. 60 may be produced by a different wiring of two cells 61 and 62 like the cell 5 and connected to a switch device 63 like the device 53 and from there to a load 64.

Figure 13:
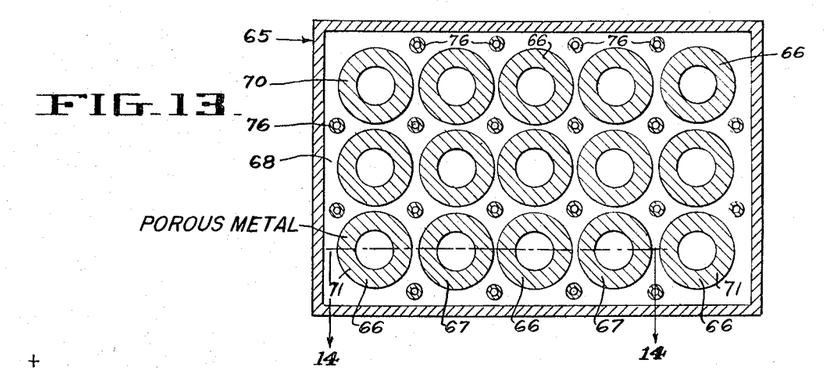
FIG. 13 is a horizontal sectional view, taken along the line 13—13 in FIG. 14, of a modified form of fuel cell in which a hydrocarbon is introduced at the anodes and oxygen at the cathodes.
Figure 14:
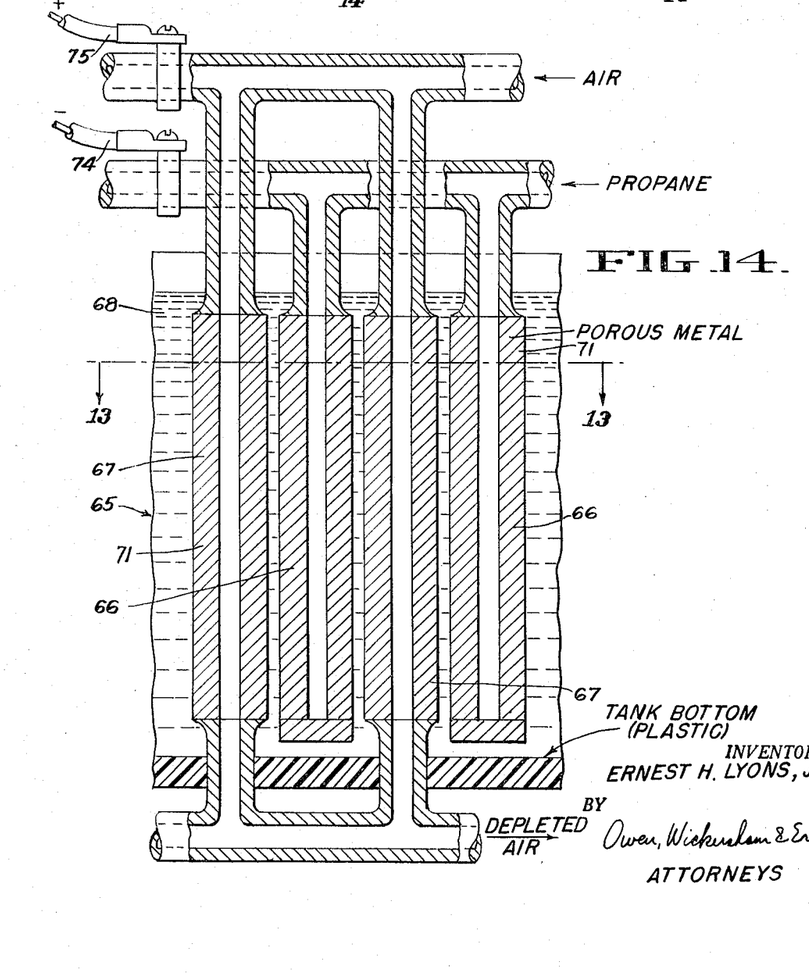
FIG. 14 is an enlarged fragmentary view in section taken along the line 14—14 in FIG. 13.

The same principles may be applied to the anode of a cell. FIGS. 13 and 14 diagrammatically illustrate a cell 65 having a plurality of propane anodes 66, a plurality of cathodes 67 (which may, for example, be oxygen cathodes), and an electrolyte 68. The anodes 66 may each comprise a tube 70 of porous material 71, such as graphite or porous carbon or porous stainless steel or other inert metal which may be impregnated or coated with a catalytic material 72 such as platinum (see FIG. 15). If desired, a porous platinum tube or a fine screen of platinum may be used as the tube 70. The purpose is to get propane into the solution 68. The propane may be supplied to the hollow interior of the tube 70 and pass to the active surface by means of openings or pores 73; or propane may be bubbled through a sparger located below the anode 66 and reach the exterior surface of the anode 66 by physical contact of the rising gas bubbles, or by diffusion as gas dissolved in the electrolyte. Another way of supplying propane is to pump through the porous anode 66 a portion of the electrolyte which has previously been saturated with propane in a separate chamber. The cathode 67 will usually be an oxygen cathode as described in the preceding example; but it may also be of hydrogen peroxide, chlorine, bromine, or some other oxidizing substance, and, if it is a gas, is preferably provided at a pressure sufficient to prevent the interior of the cathode 67 from being flooded with electrolyte. The cathode 67 may have the same basic structure as the anode 66 (e.g., see FIG. 15). The electrolyte 68 for this cell 65 is preferably acidic (e.g. 20–30% $H_2SO_4$ in water) because a basic electrolyte, although it helps to maintain or restore the active surface of the anode, is converted to bicarbonate by the carbon dioxide produced by the oxidation of the propane, and the activity of the anode surface is impaired in bicarbonate solution. The anode 66 has a terminal 74, and the cathode 67 has a terminal 75 and these terminals 74 and 75 may be connected to an external circuit like one of those in FIGS. 1–4.

For example, in a propane-oxygen cell 65 using sulfuric acid as an electrolyte 68, and small platinum wire electrode the theoretical voltage is about 1.06 volts, but when using cells constructed on this basis, ordinarily the voltage drops from an initial value near 1.06 volts to about 0.2 volt within a few milliseconds of withdrawing even minimal current, after which the voltage drifts and no steady reading is obtained; and no current greater than a few milliamperes per square centimeter of anode surface can be withdrawn from the cell.

As in the previous example, my invention incorporates a type of switching device such as the commutator 14 or electronic switching device of FIG. 1. In a cell 65 with a small platinum wire propane anode 66, a small platinum wire oxygen electrode 67, and a sulfuric acid electrolyte 68, I have been able to withdraw a current of 20 milliamperes per square centimeter of anode and cathode surface at a voltage of 1.01 by interrupting the circuit at a rate of 204 times per second, using approximately equal "on" and "off" periods.

Nevertheless, during some seconds of such discharge, the voltage of the cell drops slowly to about 0.43. It can be restored by anodizing the anode 66, and this may be done by imposing an external voltage of about 1.3 for about 0.03–0.1 second. The anode 66 then resumes its activity, as shown by the production of interrupted current at 20 milliamperes per square centimeter with a potential of 0.91 volt, just as before. This reactivation occurs whether the anodization takes place within cell 65 (as by connecting a series of secondary stainless-steel-rod cathodes 76 to a circuit like that of FIG. 3, or even better to a circuit like that in FIG. 16) or whether the anode is removed to a separate vessel containing fresh electrolyte, anodized as described, rinsed, and replaced in the cell 65, showing that the change occurs on the anode surface, and is not the result of the accumulation of an oxidizing agent, such as hydrogen peroxide, in the electrolyte as a result of the anodization. I have observed that the faradays of electricity which can be withdrawn from the cell 65 while the anode 66 remains in an active state is many times the faradays which are needed to restore the activity by anodization. The anode appears to recover its activity spontaneously although slowly in basic electrolytes, but as already explained, such an electrolyte becomes carbonated in continued service and is therefore undesirable. Possibly, the activity is the result of the formation of a particular oxide of platinum on the anode surface, and it may be that in operation this oxide is converted to a lower oxide or to bare platinum neither of which is sufficiently active to catalyze oxidation. More likely, the anode surface is covered with adsorbed oxygen in some form not included in the usual sense of the word "oxide." The inactive or less active state may comprise merely a lower saturation or another form of adsorption differing in some chemical or physical way, or bare platinum, or adsorbed water or hydrogen or hydroxide. However, accumulation of partial oxidation products of propane may account, at least in part, for the loss of the desired activity. Whatever the explanation, the process just described is effective.

Figures 15, 16, 17, 18:
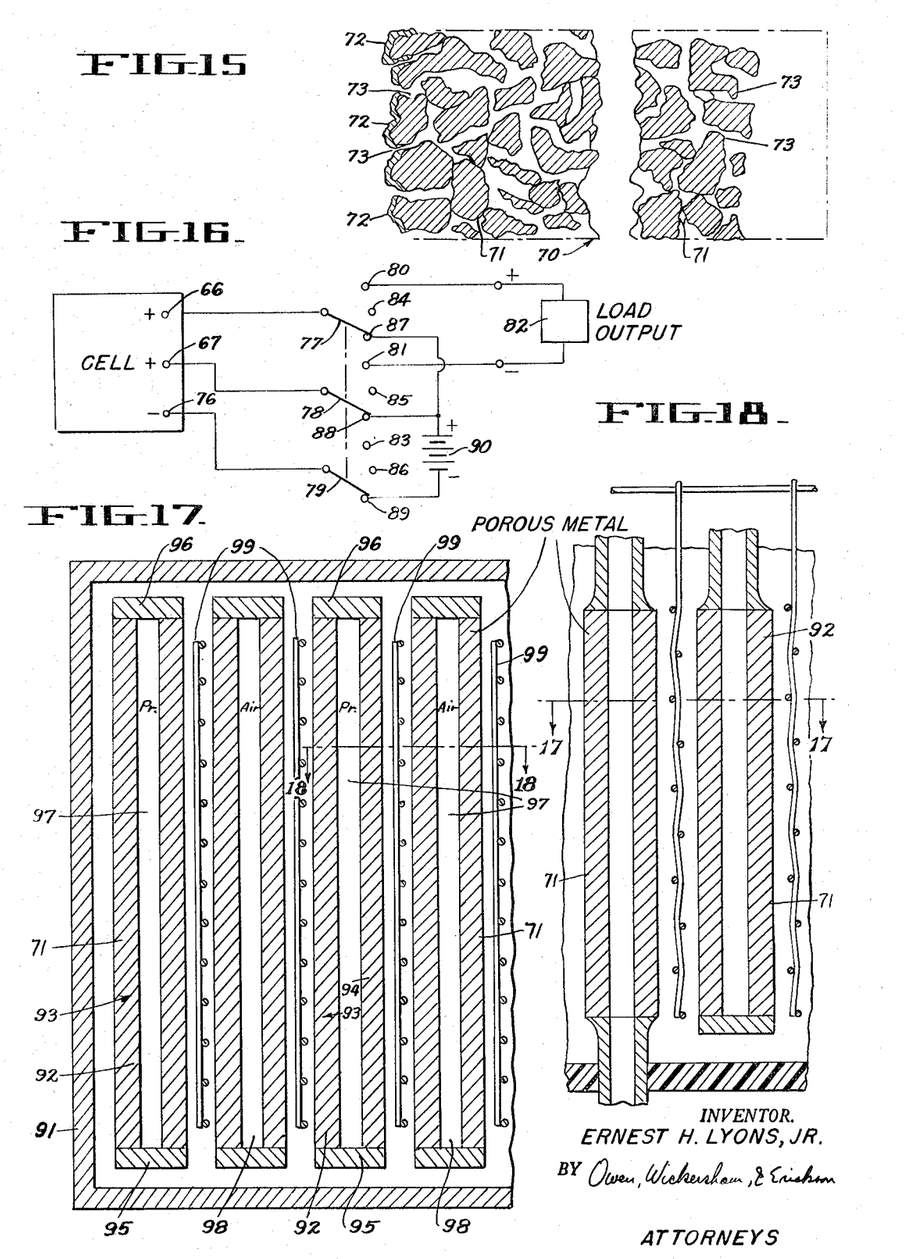
FIG. 15 is an enlarged fragmentary view in vertical section of an electrode that may be used in the cell of FIG. 13.
FIG. 16 is a circuit diagram of a circuit for use with the cell of FIG. 13, the cell being shown in this view in simplified form.
FIG. 17 is a fragmentary horizontal sectional view taken along the line 17—17 in FIG. 18, of another modified form of hydrocarbon fuel cell.
FIG. 18 is a fragmentary vertical sectional view taken along the line 18—18 in FIG. 17.

An occasional anodic pulse to the anode 66 can be provided through the circuit shown in FIG. 16. Both the anode 66 and the cathode 67 may be periodically anodized in the acidic electrolyte by means of the auxiliary cathode 76 and the switching arrangement of FIG. 16. Three three-position switches 77, 78, and 79 (which may be ganged together) are used. The switch pole 77 is connected to the anode 66, the switch pole 78 is connected to the main cathode 67, and the switch pole 78 is connected to the auxiliary cathode 76. When the switch poles 77 and 78 close against respective contacts 80 and 81 they close the external circuit through a load 82. At this time the switch 79 may be open or closed against an open contact 83. The normal "off" cycles occur when the switches 77, 78, and 79 engage open contacts 84, 85, and 86, none of which lead anywhere. Then at usually less frequent occasions—for example once for every ten normal off-cycles—a cam, ratchet, or electronic device or other means may close the switch poles 77, 78, and 79 against contacts 87, 88, and 89. On these occasions, the contacts 87 and 88 are both connected to the positive side of an auxiliary anodizing battery 90 (or any other suitable source of electrical current), while the contact 89 is connected to the negative side of the current source or battery 90. As a result, the auxiliary cathode 76 is charged negatively, and the anode 66 and normal cathode 67 are both anodized. The cycling of the switches 77, 78, and 79 may, of course, be motorized. In this way both electrodes may be anodized simultaneously; but other ways of accomplishing this anodization may be used alternatively.

A cell 91 basically like the cell 65 is shown in FIGS. 17 and 18. Instead of tubes 70, a different structure is used. Each anode 92 comprises a pair of porous plates 93 and 94 (generally of the internal structure of the tube 70 in FIG. 15) and a pair of solid end plates 95 and 96, providing a hollow rectangular interior 97 into which the anode gas may be sent. Each cathode 98 has a similar structure and receives the cathode gas. Auxiliary cathodes 99 (for anodizing) may comprise screens of stainless steel or other suitable material, or perforated plates of the same. Suitable manifolds (not shown) may join the anodes together in one group and the cathodes together in another group, as in FIG. 14. Operation is as in FIGS. 13 and 14.

To illustrate what happens with a propane anode, consider a circuit like that in FIG. 1 with a manual key as the switch 14 and a cathode-ray oscilloscope as part of the load 13. A series of oscillograms, FIGS. 19–23, has been prepared using a cell of the type The cell included a mercury-mercurous sulfate reference electrode, which was used in the manner described in the preceding example. In this case, commercial propane was bubbled through a sparger. The platinum electrode was a duplicate of the one used in the first example. The reference electrode was used in this instance rather than an oxygen cathode so that the oscillograms would reflect the behavior of the propane anode without any influence from a novel cathode. The theoretical potential at 25° C., calculated from standard free energies for complete oxidation to carbon dioxide and water, and assuming that the partial pressure of carbon dioxide is 1 atm., is —0.480 volt.

The platinum electrode was platinized in the conventional way, by making it cathodic for 5 minutes at 3.0 volts in 5% chloroplatinic acid solution. When used directly from the platinizing bath, or after cathodizing in 1 M. $H_2SO_4$, the potential of the cell varied erratically from —0.2 to —0.48 volt or even higher, depending on the voltage used in the pre-treatment. When the voltage exceeded —0.48 volt, it dropped off rapidly, either with or without current flow. The rate of voltage drops slowed down appreciably at about —0.48 volt, but apparently a stable potential was not established. The potential might be termed "semi-stable," since there was a tendency to return to it after limited current flow, but it was not a reversible rest potential in the accepted sense. However, after pre-anodizing the electrode in 5% $H_2SO_4$, the cell showed a voltage of —0.27. If the freshly platinized anode was briefly cathodized in 10% KOH, allowed to stand 10 minutes in the electrolyte, then rinsed and introduced into the cell, the voltage was —0.27. Apparently these two pretreatments are roughly equivalent.

An electrode prepared by applying a coating of rhodium from an acidified rhodium chloride solution was anodized in sulfuric acid and then placed in the acid test cell. This electrode came to —0.27 volt in 45 minutes and held it for three hours, at which time the experiment was stopped. A palladinized electrode required five hours to reach the same potential, but maintained it after that. In each case, the coating was deposited on bright platinum wire. It is likely that the conditions under which the black, spongy coatings of such metals are deposited have more influence on the activity of the electrode than the particular metal used.

Figure 19:
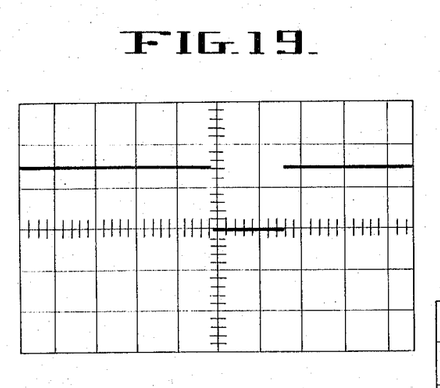
FIGS. 19 to 23 are oscillograms obtained from a test hydrocarbon fuel cell constructed and operated according to the present invention.

FIG. 19 is an oscillogram obtained from the propane-mercuric oxide cell on steady discharge with a pre-anodized, platinized electrode, with discharge across a 10,000 ohm load. A microammeter inserted in the circuit showed a current density of about 0.7 ampere per square centimeter of anode surface. The voltage scale is 0.2 volt per centimeter (the grids being one centimeter grids). The interruption 100 was made to establish the zero potential on the screen. The voltage is −0.245; the difference between this and −0.27 as registered on a vacuum tube voltmeter (not shown) may be attributed to IR drop and to uncertainties in calibration of the oscilloscope; or it may signify an alteration in the rest potential of the electrode. The oscillogram, which covers a period of two seconds, shows no appreciable polarization, and none was observed after sixteen minutes of continuous discharge.

Figure 20:
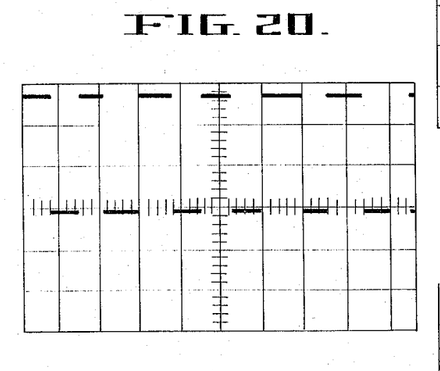

FIG. 20 shows the same experiment with periodically interrupted current; the voltage scale is 0.1 volt per centimeter and in this case the voltage is −0.27 on the oscilloscope.

Figure 21:
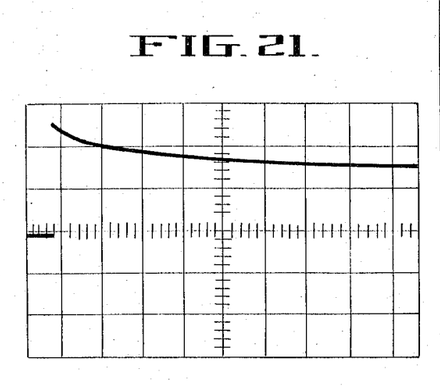

FIG. 21 shows the discharge curve with a load of 100 ohms. The voltage scale is 0.05 volt per centimeter. A milliammeter inserted in the circuit showed a current density of about twenty milliamperes per square centimeter. The polarization reached 0.06 volt in two seconds. After three minutes (not shown on the oscillogram) it was 0.14 volt, and was still increasing slowly.

Figure 22:
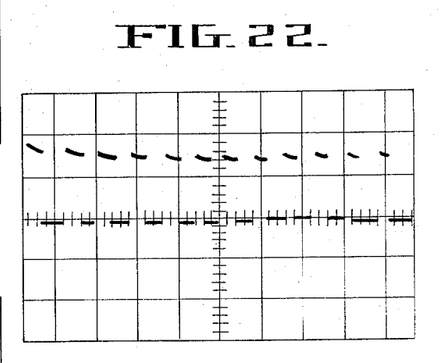

FIG. 22 shows polarization under the same conditions as FIG. 21, but with the current interrupted about six times per second. Since current is actually flowing only about half the time, points on these curves should be compared to those at half the time on FIG. 21. The voltage scale is 0.05 volt per centimeter. It can be seen that the initial voltage is less than in FIG. 21, apparently due to instability of the oscilloscope, but the *loss* in voltage, or polarization, is about 0.02 volt after two seconds, compared to 0.05 volt after one second with steady discharge as in FIG. 21. In time periods longer than are shown on the oscillograms, this advantage was maintained, and after four minutes the polarization was 0.06 volt on intermittent discharge, and 0.15 volt on steady discharge. The recovery during idle periods, presumably the result of partial dissipation of concentration effects, is marked.

Figure 23:
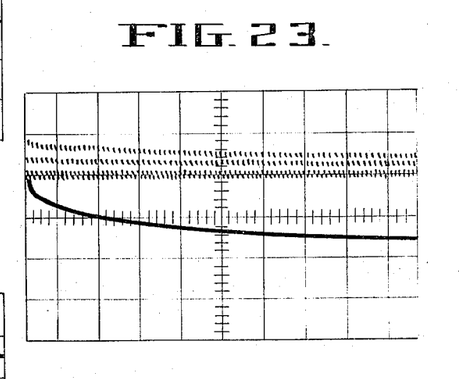

FIG. 23 shows a steady discharge curve for a period of twenty seconds with a load of 100 ohms, a voltage scale of 0.05 volt per centimeter, and an approximate current density of twenty milliamperes per square centimeter. It also shows four successive curves of interrupted discharge for twenty seconds at the same load and current density. After twenty seconds of actual current flow on the interrupted cycle, the polarization is 0.03 volt compared to 0.07 volt on continuous discharge. After forty seconds the polarization on the intermittent cycle is increasing very slowly indeed. For example, after twenty-two minutes, steady current polarization was 0.16 volt; interrupted current polarization was 0.05 volt.

In using the propane anode and oxygen cathode in the same cell, the current interruption serves for both electrodes; separate switching mechanisms are not required.

Interpretation of these curves is not a simple task, for reasons already noted in discussing the oxygen electrode. No polarization was noted at low current densities with either steady or interrupted currents; hence the comparison which is significant for the oxygen electrode is not possible here. But the fact that the time required to reach a specified value of the apparent polarization is three or four times greater with interrupted or pulsed currents than with steady currents, for the same total current passed, indicates that an activation factor may be operating with this electrode as with the oxygen electrode; for the improvement is much greater than is to be expected from diffusion alone during the relatively short "idle" or low current periods, and this ratio pointed to an activation factor in the case of oxygen.

Figures 24, 25:
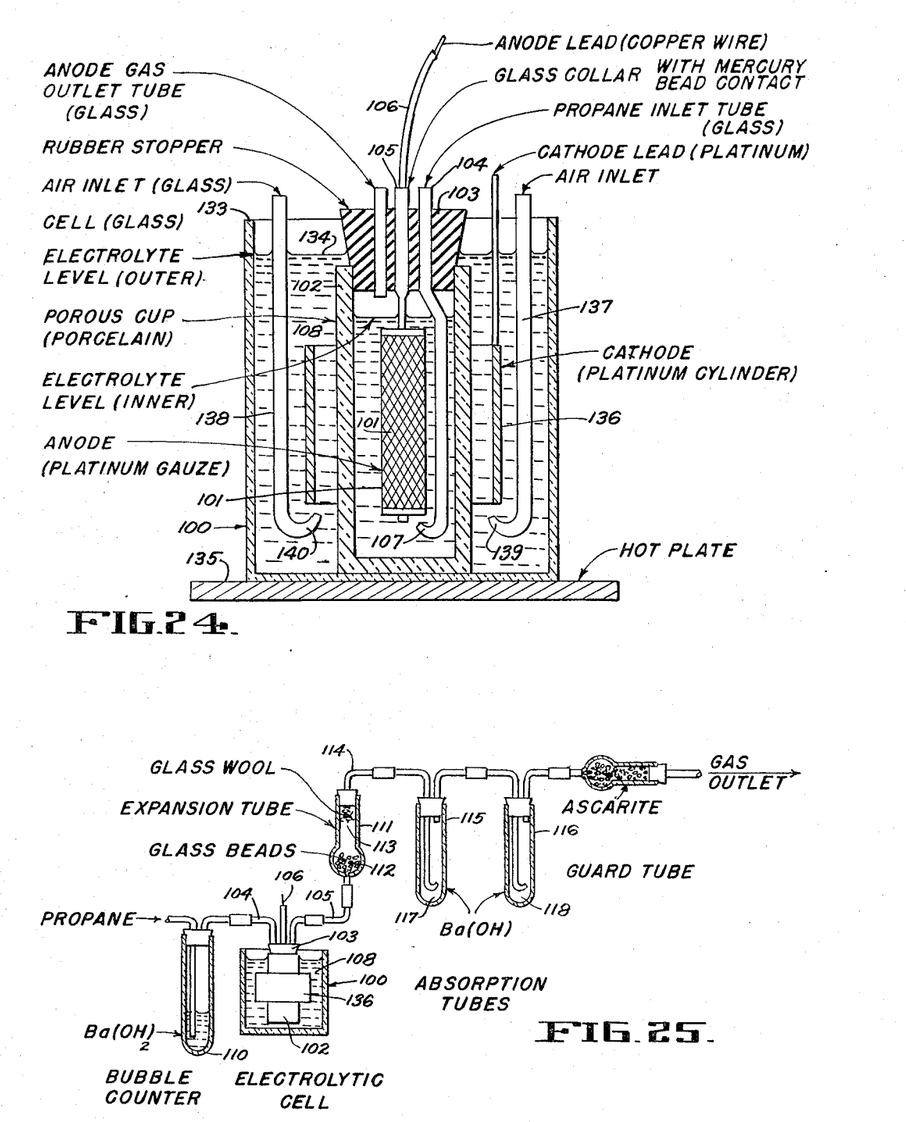
FIG. 24 is a view in elevation and in section of another modified form of hydrocarbon fuel cell embodying the principles of the invention and used for test purposes.
FIG. 25 is a diagrammatic view in elevation showing a carbon-dioxide test installation employing the cell of FIG. 24.

However, in order to obtain unequivocal evidence, another set of experiments was carried out using the arrangements shown in FIGS. 24 to 28, in which the amount of carbon dioxide produced by oxidation of the propane was determined and compared, in terms of current efficiency, to the current which had passed through a cell 100 (see FIG. 24).

In these experiments, the cell 100 had an anode 101 that was a platinum gauze cylinder about one centimeter in diameter and about five centimeters long. The total surface was estimated as twenty-four square centimeters, of which about fourteen square centimeters was considered to be effective, since the interior surfaces would not be exposed to the action of the electrolytic current (except when the exterior is highly polarized). At 100% current efficiency, and twenty milliamperes per square centimeter, this produces 0.069 g. $CO_2$ per hour, so that even a small yield would be detectable.

It was found that the current efficiency generally improved over a period of time, so that most runs were six hour runs.

As shown in FIG. 24, the anode 101 was enclosed in a porous porcelain cup 102, and the cup 102 was closed with a rubber stopper 103 provided with a gas inlet tube 104, a gas outlet tube 105, and an anode lead 106. A nozzle 107 on the inlet tube 104 was drawn down to a very fine capillary, which delivered bubbles not over 1 mm. in diameter at the pressures employed; it was placed just below the anode 101 in the cup 102 so that the bubbles could contact the electrode 101 as they rose to the surface of an electrolyte 108. Commercial propane was passed to the anode 101 through a bubble counter 110 (FIGS. 25 and 26), and was regulated to supply about a cubic centimeter of propane per second. To eliminate carbon dioxide as a possible impurity, the solution in the bubble counter 110 was half saturated barium hydroxide; but even after 300 hours of operation, no precipitate appeared, showing that the commercial propane used had very little carbon dioxide, if any.

The gases issuing from the anode cup 102 through the outlet tube 105 were, as shown in FIG. 25, passed through an expansion bulb 111 containing glass beads 112 at the bottom and a plug 113 of glass wool above the beads, to remove droplets of electrolyte 108 carried out as a fine spray. No visible films or droplets collected in a glass tubing 114 leading from the exit side of this bulb 111. The gases were then passed through two absorption bulbs 115 and 116, both filled with half-saturated barium hydroxide solution 117, 118. Visual observation of the barium hydroxide precipitate was clear and showed striking advantage for pulsed current, but did not suffice for quantitative determinations.

Figure 26:
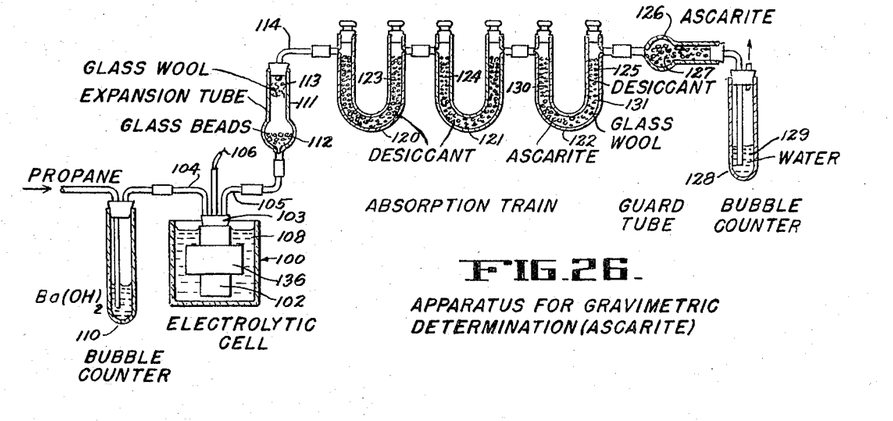
FIG. 26 is a view similar to FIG. 25 showing a quantitative test arrangement for carbon dioxide formed in the cell of FIG. 24.

Consequently, as shown in FIG. 26, in most of the runs the absorption bulbs 115 and 116 were replaced by an absorption train consisting of two dehydrating bulbs 120 and 121 and an ascarite absorption tube 122 containing a section filled with the same desiccant 123, 124, 125 used in the dehydrating bulbs, (sometimes calcium chloride and sometimes magnesium perchlorate). A safety bulb 126 charged with ascarite 127 protected the exit end of the absorption train, and finally there was a bubble counter 128 containing water 129 to check against the input bubble counter 110 so as to detect major leakage. The second dehydrating bulb 124 was weighed every three or four runs to make certain that the dehydration was complete.

The ascarite-desiccant bulb 125, the third bulb, contained a section filled with ascarite 130 separated from the desiccant 125 by glass wool 131. The gain in weight of the ascarite-desiccant tube 125 was taken as the weight of carbon dioxide produced in the run.

The porous cup 102 containing the anode 101 was immersed in an open glass beaker 133 containing the electrolyte 108, with the lip of the cup 102 below the electrolyte level 134 to avoid leakage around the rubber stopper 103. The electrolyte 108 was a solution of reagent grade sulfuric acid, usually 1 M. It was heated by a thermostatically regulated hot plate 135, but the temperature varied about 6 or 7°, rising by this amount with the longer runs at high currents.

The cathode was a cylinder 136, about 4 cm. high and 5 cm. in diameter, formed of platinum sheet, coaxial with the anode 101, and placed as centrally as possible along its axis to avoid current variations around the circumference of the electrodes.

Figure 27:
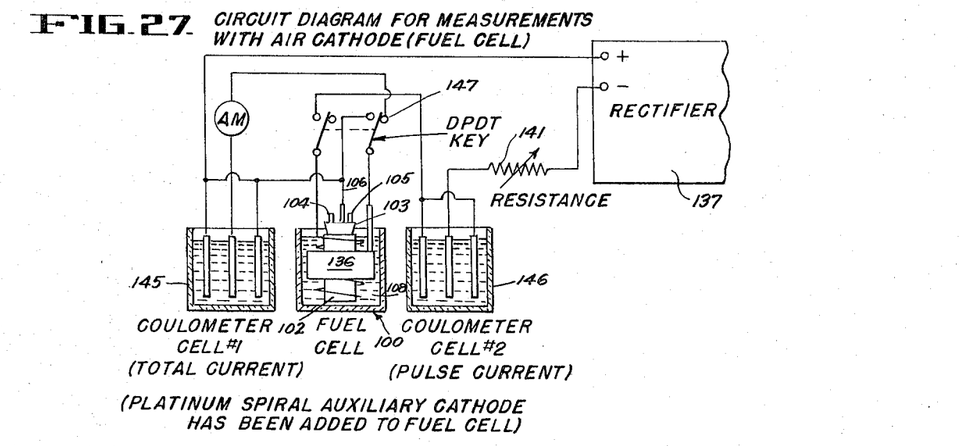
FIGS. 27 and 28 are other test arrangements for the cell of FIG. 24.

Usually the platinum cathode 136 was bright, and was operated as a hydrogen electrode; that is, a rectifier 137 (FIG. 27) was used to supply current to give the desired density at the anode 101, while hydrogen was evolved at the cathode 136. Sometimes, however, the cell 100 was operated spontaneously as a voltaic or fuel cell, without external current except for pulses, as shown in FIG. 27. In this run, the cathode 136 was platinized, and air was supplied to it by means of two tubes 137, 138 and their capillary glass jets 139, 140.

Usually the anode 102 was platinized by conventional treatment in 5% chloroplatinic acid for ten minutes at an estimated current density of three milliamperes per square centimeter.

Figure 28:
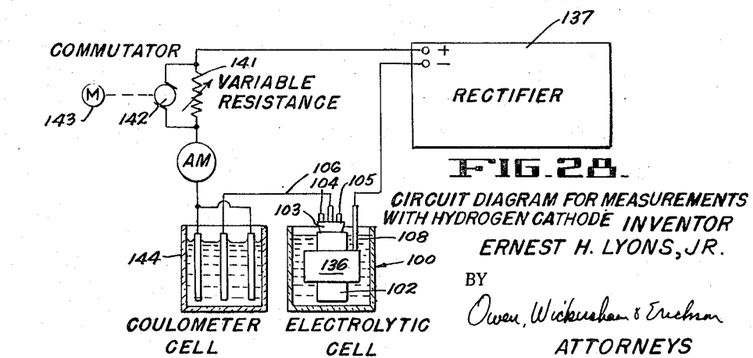

Current was supplied by a full-wave, ballasted selenium rectifier 137; according to the manufacturer, ripple does not exceed 5% under full load. Operation was at less than 10% of rated rectifier capacity. Current was fed through a series rheostat 141 to the cell 100, as shown in FIG. 28. The rectifier 137 was set to give a desired high current surge (800 ma.) to the cell 100, and then the rheostat 141 was adjusted to cut this value to the desired low current (220 ma.). A commutator 142 turned by a variable speed laboratory motor 143 was connected to shunt out the rheostat 141 during the surge periods. Oscilloscopic examination showed quite ragged make and break, and the speed of the commutator 142 was not readily standardized, but after preliminary trials, an effort was made to hold it to three cycles per second. While the speed did not seem critical as far as these experiments show, there seemed to be some disadvantage in too high speeds. Contacts were adjusted so that about one-third of the cycle was a high current density pulse, and two-thirds represented "normal output," at low current density.

After a run, the anolyte and catholyte were removed for tritration by 0.1 N. $KMnO_4$ to determine possible intermediates. Fresh electrolyte was supplied to avoid drying of the platinized electrode. No oxidizable substances were found in the catholyte, but traces were almost always present in the anolyte. They were present in greatest amount in blanks at low current density, but never exceeded in equivalents 2% of the faradays of electricity passed. At high current density, blanks (with steady, unpulsed current) never showed more than a trace of oxidizable matter. It is possible that this substance was hydrogen peroxide.

A coulometer cell 144 (FIG. 28) with 4 x 6 cm. copper electrodes and acidified copper sulfate electrolyte was connected in series with the cell 100 so that both high and low current pulses passed through it. The arrangement of FIG. 28 was used in measurements relating to the hydrogen cathode, and the arrangement of FIG. 27 with two coulometers 145 and 146 and a manual key 147 was used in measurements relating to the air cathode. The increase in cathode weight was taken as a measure of the faradays passed; the theoretical carbon dioxide yield was calculated, and used as a basis for an efficiency calculation.

Three kinds of blanks were run. In the first kind, the apparatus was allowed to bubble overnight without any current flowing. No significant carbon dioxide was ever formed catalytically in these runs; in each case, there was a slight loss of weight in the coulometer, doubtless due to oxidation by atmospheric oxygen, since the electrical circuit was open.

A second kind of blank was run with steady current at low current density (usually twenty milliamperes per square centimeter). A little carbon dioxide always resulted, but current efficiencies never exceeded 1.5%.

A third series of blanks was run with steady current at high current density—that is, the current density of the pulse. In this case the current efficiency never exceeded 0.20%. This may mean that there was a maximum rate of $CO_2$ production under steady current conditions, not much affected by increasing the current density. As mentioned previously, the anolyte usually contained an appreciable amount of substances reacting with permanganate after a low current-density steady current blank, but only a trace after a high current-density steady current blank.

*Example 1 (blanks)*

The apparatus described above was used to run the three types of blanks just discussed with a platinized anode in 1 M. $H_2SO_4$, as follows:

(1) With no current flowing, the apparatus was allowed to bubble overnight, with the electrolyte at 26–31° C. The total carbon dioxide formed in fourteen hours was 0.0002 mg.

(2) A two-hour run at steady current flow at a density of about twenty milliamperes per square centimeter (meter reading) with the electrolyte at 26–31° C. resulted in the production of 0.0002 mg. of carbon dioxide. Using the coulometer for true quantitative measurement of the total flow of current during this time, this value represented a calculated current efficiency of 0.02%. (Throughout these examples the coulometer was used in the calculations, not the meter reading of current density.)

A six-hour run under the same conditions gave 0.0007 mg. of carbon dioxide, which in this instance represented a current efficiency of 0.02%.

(3) A two-hour run at steady current flow at a density of about seventy-two milliamperes per square centimeter, with the electrolyte at 29–35° C. produced only 0.0001 mg. of carbon dioxide, and a current efficiency of 0.03%.

A six-hour run under these latest conditions produced 0.0004 mg. of carbon dioxide but a current efficiency of only 0.0003%.

*Example 2*

The apparatus of Example 1, with the platinized anode, was then run at steady current flow at a density of twenty milliamperes per square centimeter, but to this was added current pulses, approximately three per second for about one-tenth of a second each and during these pulses the total current density was about seventy-two milliamperes per square centimeter.

A two-hour run at 26–31° C. produced 0.0038 mg. of carbon dioxide and a current efficiency of 2.5%.

A six-hour run at 26–31° C. produced 0.0074 mg. of carbon dioxide and a current efficiency of 4.9%.

*Example 3*

Example 2 was reproduced, except that a bright platinum anode was used.

A two-hour run produced 0.0072 mg. of carbon dioxide and a current efficiency of 4.7%.

A six-hour run produced 0.0303 mg. of carbon dioxide and a current efficiency of 7.0%.

*Example 4*

Example 2 was repeated, except at 80–89° C.

A two-hour run produced 0.0098 mg. of carbon dioxide and a current efficiency of 6.6%.

A six-hour run produced 0.0492 mg. of carbon dioxide and current efficiency of 9.3%.

*Example 5*

Example 2 was repeated in a six-hour run, except at 50–60° C. Carbon dioxide produced was 0.0411 mg., and the current efficiency was 7.9%.

Example 6

The conditions of Example 4 were employed, but in an electrolyte of 0.01 M. $H_2SO_4$. A six-hour run produced 0.0558 mg. of carbon dioxide and a current efficiency of 12%.

Then the anode was freshly replatinized and given another six-hour run. This time carbon dioxide production was 0.0900 mg., and the current efficiency was 21%.

Example 7

A bright electrode was used in 0.01 M. $H_2SO_4$. A six-hour run, like that of Example 3, resulted in 0.0658 mg. of carbon dioxide and a current efficiency of 13%.

When similar cells were constructed using methane as a fuel in the place of propane, the observed voltage in a semisteady "rest" state was −0.16 volt, whereas that computed theoretically is −0.158 volt. Furthermore, when cells were constructed as follows:

Pt, $C_3H_8$ (1 atm.)/KOH (10%)/HgO (c), Hg (liq.)

the potential was −0.87 volt. The theoretical potential, calculated at 25° C. on the assumption that the electrolyte contains 0.1% carbonate, is −0.875 for complete oxidation. When methane was substituted for the propane, the potential became −0.88 volt, which is substantially the theoretical value of −0.887 volt. However, the exact significance of these potentials is not clear, for they are strongly affected by the pre-treatment of the electrode. To obtain these semi-steady potentials, preanodization at potentials slightly greater than the resulting potential is required. Although, as has previously been explained, the basic electrolyte is less desirable, the agreement of the observed values with the theoratical values in four different cases is evidence that the oxidation of the hydrocarbon proceeds substantialy to completion. It was found also that propane is consumed in amounts which would be expected for complete oxidation, to produce the current withdrawn.

Just as was explained with the oxygen cathode, the surface state of the electrode is extremely important for the propane anode. Also, as in the preceding case, two types of voltage shift may be distinguished, a rapid one presumably due to concentration polarization, and a slower one that may be due to a change in the state of the catalyst. Recovery from concentration changes is rapid; that from the change in surface activity is quite slow, unless assisted by an anodic pulse as previously described.

Figure 2:
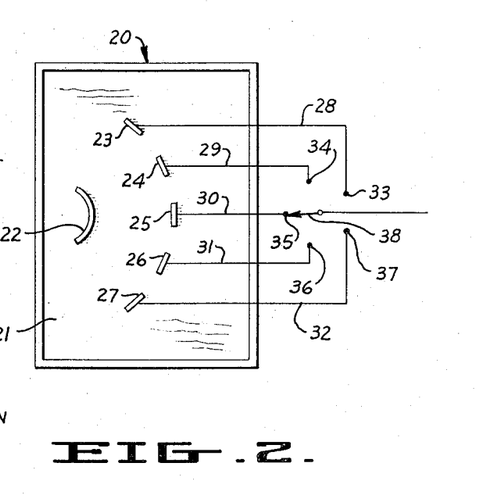
FIG. 2 is a generally top plan schematic view of a modified form of cell also embodying the invention.

The expedients described for the oxygen cathodes in connection with FIGS. 2, 3, and 4 are equally applicable to a hydrocarbon anode or to a hydrogen anode. Furthermore, a bimetallic electrode, such as platinum-gold, platinum-palladium, or platinum-stainless steel, will recover more rapidly in idle periods than a pure platinum electrode, doubtless because the bimetallic system supplies an anodic potential to the less noble metal.

Other fuels than methane and propane may be employed at cathodes prepared according to my invention. Among them are other hydrocarbons, such as ethane, butane, pentane, ethylene, acetylene. Also hydrogen, carbon monoxide, formaldehyde, methanol, and ethanol may be used. Other oxidizing agents than oxygen can be employed at anodes prepared according to my invention. Among them are chlorine, bromine, ozone, and hydrogen peroxide. In the case of the halogens, the electrolyte will, of course, contain the corresponding halide ions; thus hydrochloric acid will normally be used with chlorine. As said before, the term "oxygen" is intended to include air and is not limited to pure oxygen.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method of operating an electrolytic cell having an anode, an electrolyte, and a cathode, at least one of said anode and cathode being a gas electrode wherein gas is supplied to the cell at a solid electrode member having a catalytic surface, said cell being used for causing current to flow externally through a load circuit connecting the anode and cathode and wherein the cell voltage is lowered by continuous operation, characterized by periodically disconnecting said cathode from said anode exteriorly of the cell at a frequency rapid enough to pass current at a voltage substantially higher than that obtained upon continuous operation, and anodizing the catalytic surface of said gas electrode during at least a portion of the time when said cathode is disconnected from said anode exteriorly of the cell.

2. A method of drawing current from a hydrocarbon fuel cell of the type having a cathode, an electrolyte, and a gaseous hydrocarbon anode, wherein the gas is supplied to the cell at a solid anode member having a catalytic surface, said cell causing current to flow externally through a load circuit connecting the anode and cathode, characterized by pre-anodizing said catalytic surface, periodically disconnecting said cathode from said anode at a frequency of at least twenty times per second for an interval of at least one two-hundredth of a second per disconnection, and applying an anodizing current to said anode during some of the time it is disconnected.

3. The method of claim 2 wherein the cathode is a gaseous oxygen electrode with a solid cathode member having a catalytic surface to which oxygen is supplied, and applying said anodizing current to said cathode during some of the time it is disconnected.

4. Electrical apparatus of the type having a cell with an anode, and a main cathode, and an auxiliary cathode, at least one of said anode and main cathode being a gas electrode, and an electrolyte, said cell causing current to flow externally through a load circuit, and wherein activation polarization of the cell tends to reduce the cell voltage a substantial amount below the theoretical voltage obtainable, characterized by means for periodically disconnecting said gas electrode from said load circuit exteriorly of the cell, at a frequency rapid enough to pass current at a voltage substantially higher than that obtained upon continuous operation, a secondary source of direct current, and means for connecting said auxiliary cathode to the negative side of said secondary source and for connecting the positive side thereof to each said gas electrode during at least part of the time when said gas electrode is disconnected from said load circuit, to anodize said gas electrode and thereby substantially diminish the activation polarization of the cell.

5. The apparatus of claim 4 having a catalytic electrode surface comprising a catalytic electrode surface material in intimate coating contact with a sub-surface material less cathodic than said catalytic material, said sub-surface material being partially exposed to and in contact with the electrolyte.

6. The electrical apparatus of claim 4, having a plurality of electrically isolated electrode members making up said gas electrode, said means for periodically disconnecting and said means for connecting acting cyclically so that some of said electrode members are connected to the other side of said cell through said load means while other of said electrode members are disconnected.

7. A plurality of electrolytic cells of claim 4 in combination with means for cyclically connecting first said cells to an external circuit while disconnecting second said cells from said circuit and then connecting said second cells while disconnecting said first cells.

8. Electrical apparatus of the type having a cell with a gaseous hydrocarbon anode, an electrolyte, and an oxygen cathode whereby oxygen is supplied to the cell at a solid cathode member and gaseous hydrocarbon is supplied to said cell at a solid anode member and an oxidation reaction takes place at the anode while a reduction reaction takes place at the cathode, each of said solid anode member and said solid cathode member having a catalytic surface, and an auxiliary cathode, thereby causing current to flow externally through a load circuit connecting the anode and cathode, characterized by means for periodically disconnecting said cathode from said anode exteriorly of the cell, at a frequency rapid enough to pass current at a voltage substantially higher than that obtained upon continous operation, a secondary source of direct current, and means for connecting said auxiliary cathode to the negative side of said source and for connecting both said solid cathode member and said solid anode member to the positive side of said source during part of the time that said cathode is disconnected from said anode exteriorly of the cell, whereby said catalytic surfaces are anodized and thereby reactivated, said means for connecting being employed at a frequency rapid enough to pass current at a relatively high voltage and to reactivate the cathode reaction to a reduction to water.

References Cited by the Examiner

UNITED STATES PATENTS

| | | | |
|---|---|---|---|
| 683,444 | 10/1901 | Cowen | 320—19 |
| 793,881 | 7/1905 | Kitsee | 136—165 |
| 949,506 | 2/1910 | Tate | 136—165.1 |
| 1,182,759 | 5/1916 | Emanuel | 136—86 |
| 2,572,918 | 10/1951 | Fisher et al. | 136—86 |
| 2,901,522 | 8/1959 | Bopp | 136—86 X |
| 3,092,516 | 6/1963 | Rightmire | 136—86 |

FOREIGN PATENTS

| | | |
|---|---|---|
| 325,530 | 1/1903 | France. |
| 274,907 | 10/1928 | Great Britain. |
| 676,830 | 8/1952 | Great Britain. |

WINSTON A. DOUGLAS, *Primary Examiner.*

ALLEN B. CURTIS, *Examiner.*